May 13, 1958

C. F. CONDER 2,834,106

APPARATUS FOR SPLITTING TUBES

Filed Nov. 19, 1956

INVENTOR
CHRISTY F. CONDER

BY C. T. Cross

ATTORNEY

2,834,106
APPARATUS FOR SPLITTING TUBES

Christy F. Conder, Fairport Harbor, Ohio, assignor to Diamond Alkali Company, Cleveland, Ohio, a corporation of Delaware Application November 19, 1956, Serial No. 622,948

2 Claims. (Cl. 30—91)

This invention relates to new and improved apparatus for cutting hollow members and more particularly relates to new and improved apparatus for longitudinally cutting tubes to facilitate their removal from tube sheets or other supports.

In the operation of large scale steam generation and utilization apparatus such as boilers, superheaters, regenerators and the like, one of the most common forms of heat exchange apparatus employed comprises a plurality of tubes or other hollow elements projecting through, and supported by, a tube sheet or other support extending transversely with respect to the longitudinal axes of the tubes. In practice, it becomes necessary from time to time to remove the tubes from such a tube sheet, or other support, in the ordinary course of repair, tube replacement, and steam equipment maintenance. The disengagement and removal of these tubes in the past has presented a problem which varied in magnitude depending upon the frequency of tube removal required, the nature of the apparatus involved, and the time and equipment available for such tube removal.

It has been proposed to remove such tubes from tube sheets by cutting the tubes longitudinally, collapsing the tube within the tube sheet and thereafter punching or pulling the tube out of its position. However, the apparatus heretofore proposed for such an operation, while perhaps suitable in specific instances, has not proved to be an entirely satisfactory solution to the problem.

Accordingly, it is a principal object of the present invention to provide new and improved apparatus for cutting hollow members to facilitate their removal from surrounding support members.

A further object of this invention is to provide a new and improved tube-cutting apparatus.

A still further object of this invention is to provide a new and improved readily adjustable tube-cutting apparatus.

These and other objects and advantages of the invention will appear more fully from the following description thereof.

Referring now to the accompanying drawings.

Generally, the apparatus of the present invention for longitudinally cutting a hollow member includes, in combination, a shank, and a cutter adjustably, yet rigidly, disposed in the shank and projecting transversely therefrom for a distance determined by the depth of the cut desired. More specifically, the cutter is held in position and adjusted in the shank by a plurality of set screws in threaded openings in said shank disposed substantially perpendicularly to each other.

Figure 1:
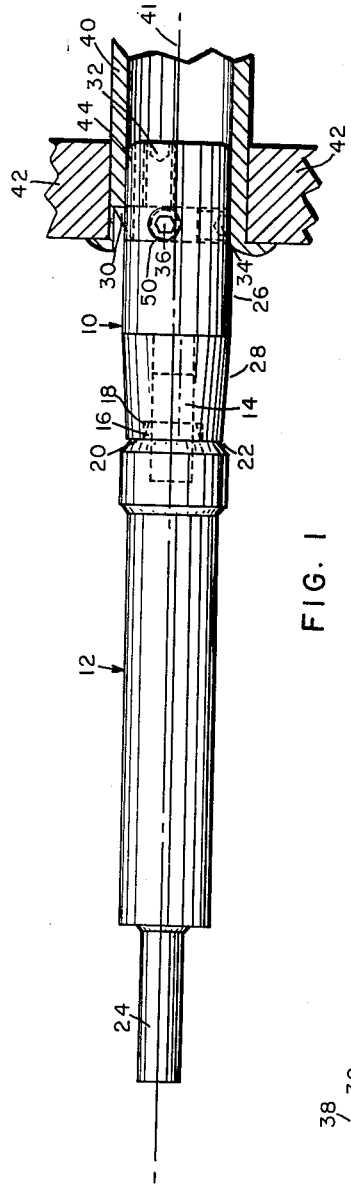
Fig. 1 illustrates in a fragmentary plan view, partially in section, apparatus embodying the present invention when inserted in a tube sheet-supported tube which is to be cut.

Reference is now made to the accompanying drawing in more detail. In Fig. 1, there is shown generally at 10 a cutter assembly of this invention comprising a shank 26 and a cutter 30. The cutter assembly 10 is supported by a cylindrical support indicated generally at 12 and threadedly secured thereto by a connecting stud 14. As shown in Fig. 1, the forward edge or boss 16 of the support 12 abuts the inner shoulder 18 of the cutter assembly 10 as well as the external shoulder 20 of the support 12 contacting the end 22 of the cutter assembly 10, whereby blows applied to the free end 24 of the support 12 by a pneumatic hammer (not shown) or other suitable device are transmitted to the cutter assembly primarily through the surfaces 16 and 18. Thus pressure transmission does not rely entirely or substantially upon any pressure transmitted through the surfaces 20 and 22 whereby outward deformation of surface 22 is avoided.

Considering the cutter assembly 10 in some detail, it will be appreciated that it comprises a shank 26 consisting of a cylindrical element having a tapered portion 28. In the cylindrical portion there is provided a cutter element 30 projecting from the cylindrical surface for a distance dictated by the depth of cut desired. The cutter assembly includes set screws 32, 34 and 36 disposed in openings 46, 48 and 50, respectively, substantially perpendicularly to each other.

Set screw 34 bearing against the bottom of the cutter 30, serves to adjust the projection of the cutter while set screws 32 and 36 serve adjustably, yet rigidly, to clamp and secure the cutter element in position. By loosening set screw 36 and tightening set screw 32, the angle assumed by the cutter element, and more particularly by the cutting edge 38, can be altered somewhat when desired.

As shown in Fig. 1, the cutter assembly is inserted in a tube 40 to be cut longitudinally which tube typically is supported by a tube sheet 42. The cutter assembly is forced, by means of a pneumatic hammer or other suitable device including hand sledge hammer, or the like, longitudinally into the tube thereby effecting a cutting of the wall 40, the chips, or other metal being cut, curling and rolling out of position into longitudinal groove 44 provided in the cylindrical element 26. When the cutter element 30 has effected a cut of sufficient length, the entire cutter is removed and, if necessary or desired, rotated, typically 180°, and the process repeated. The tube 40 is then collapsed by chisel blows or other pressure application, preferably applied at points intermediate the positions of wall cut and the thus-collapsed tube either pushed or pulled from its position in the tube sheet. In a typical application, the tubes to be removed from a tube sheet are severed a short distance, e. g., a few inches, from the tube sheet; cutting these short tubes longitudinally in accordance with this invention permits their ready collapse and removal.

Figure 2:
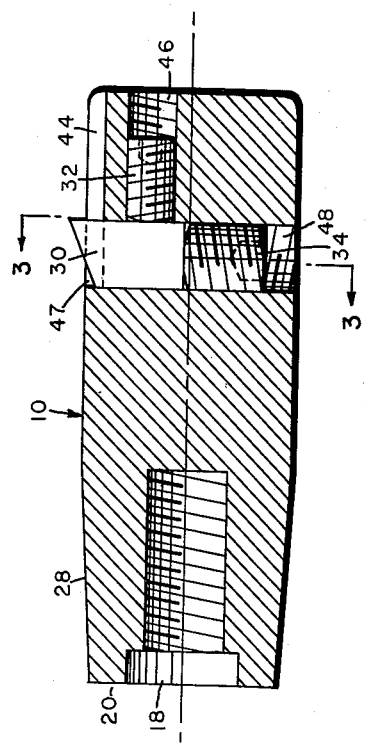
Fig. 2 is an enlarged sectional view of the portion of the apparatus shown in Fig. 1.

Fig. 2 illustrates, in an enlarged sectional view, the cutter assembly 10 as shown in Fig. 1. As will be appreciated, the cutter element 30 typically is square or rectangular in cross section, although round cutters also may be used, hence, the opening 47 into which the cutter is disposed, also is of the same shape to prevent twisting or turning of the cutter in use. Set screw 32 is threadedly engaged in opening 46. Set screw 34 similarly is threadedly engaged in opening 48, it being appreciated that openings 47 and 48 coincide within the shank 26 but that opening 47 is of a cross section corresponding to that of the cutter element employed while opening 48 is round and threaded for at least a portion of its length.

Figure 3:
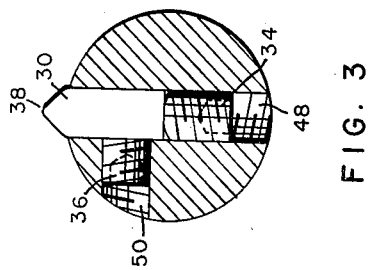
Fig. 3 is a view taken along the line 3—3 of Fig. 2.

Fig. 3 illustrates in a sectional view taken along the lines 3—3 of Fig. 2, the cylindrical configuration of the cutter assembly 10. As shown in Fig. 3, set screw 36 is threadedly engaged in opening 50. It will be appreciated, thus, that the intersecting openings 46 and 50 define a plane parallel to and spaced toward the cutter 30 from the longitudinal axis 41 of the apparatus.

The apparatus of this invention provides an economical and highly advantageous device for rapidly and cleanly cutting tubes from tube sheets. In practice, it is contemplated that a pneumatic hammer or other suitable pressure stroke device is to be employed in driving the cutter into the tube. A typical tube wall cut using this adjustable apparatus is made to within about 1/32 inch of the outer tube wall surface although it will be understood that, if desired, the cut may extend entirely through the wall. Typical pneumatic hammer apparatus has about a 1/2–5/8 inch stroke so that the apparatus is merely inserted in the tube up to the cutter 30 and with the reciprocating pressure strokes quickly and cleanly cuts through the tube wall thickness for the desired distance longitudinally along the pipe wall.

It will be appreciated, of course, that the cutter 30 may be formed from any suitable tough, high strength metal cutting materials, including various cutting steels, tool steels, high speed steels, stellite, cemented tungsten carbide, and the like, depending on the particular application intended. Similarly, the other portions of the apparatus may be fabricated from suitably strong and tough steels capable of resisting repeated impact and deformation.

It is to be understood that although the invention has been described with specific reference to particular embodiments thereof, it is not to be so limited, since changes and alterations therein may be made which are within the full intended scope of this invention as defined by the appended claims.

What is claimed is:

1. Apparatus for longitudinally cutting the wall of a hollow tube extending through a tube support when forced into said tube, said apparatus comprising in combination a support, and a cutter assembly secured thereto, said cutter assembly comprising a cylindrical shank provided adjacent its free end with three intersecting openings perpendicular to each other, one of said openings containing a cutter which projects therefrom for a distance dictated by the depth of cut desired, the plane including the longitudinal axes of the other two openings being parallel to and spaced towards the cutter from the longitudinal axis of said shank.

2. A tube cutter comprising in combination a cylindrical shank provided adjacent one end with three intersecting openings, one of said openings containing a cutter which projects therein for a distance dictated by the depth of cut desired, the openings containing set screws to position said cutter and hold it in place, the opposite end of said shank being provided with an annular shoulder to receive and transmit reciprocal longitudinal impact to said cutter, said shoulder having therewithin a second annular shoulder also adapted to assist in transmitting impact to said cutter, there being a reduced diameter threaded opening with said shoulders to engage means to impart longitudinal cutting movement thereto.

References Cited in the file of this patent

UNITED STATES PATENTS

| | | |
|---|---|---|
| 408,162 | Condon | July 30, 1889 |
| 817,319 | Hoffa | Apr. 10, 1906 |
| 1,276,458 | Wagner | Aug. 20, 1918 |
| 1,448,170 | Utzinger | Mar. 13, 1923 |
| 1,598,458 | Sullivan | Aug. 31, 1926 |
| 1,970,016 | Morton | Aug. 14, 1934 |
| 2,105,757 | Rosenberg | Jan. 18, 1938 |
| 2,176,626 | Gentry | Oct. 17, 1939 |
| 2,391,794 | O'Brien | Dec. 25, 1945 |
| 2,427,843 | Dugger | Sept. 23, 1947 |

FOREIGN PATENTS

| | | |
|---|---|---|
| 1,420 | Great Britain | of 1898 |